March 18, 1941. A. KUHNS 2,235,501
SLIP COUPLING DRIVE ASSEMBLY
Filed Aug. 14, 1939
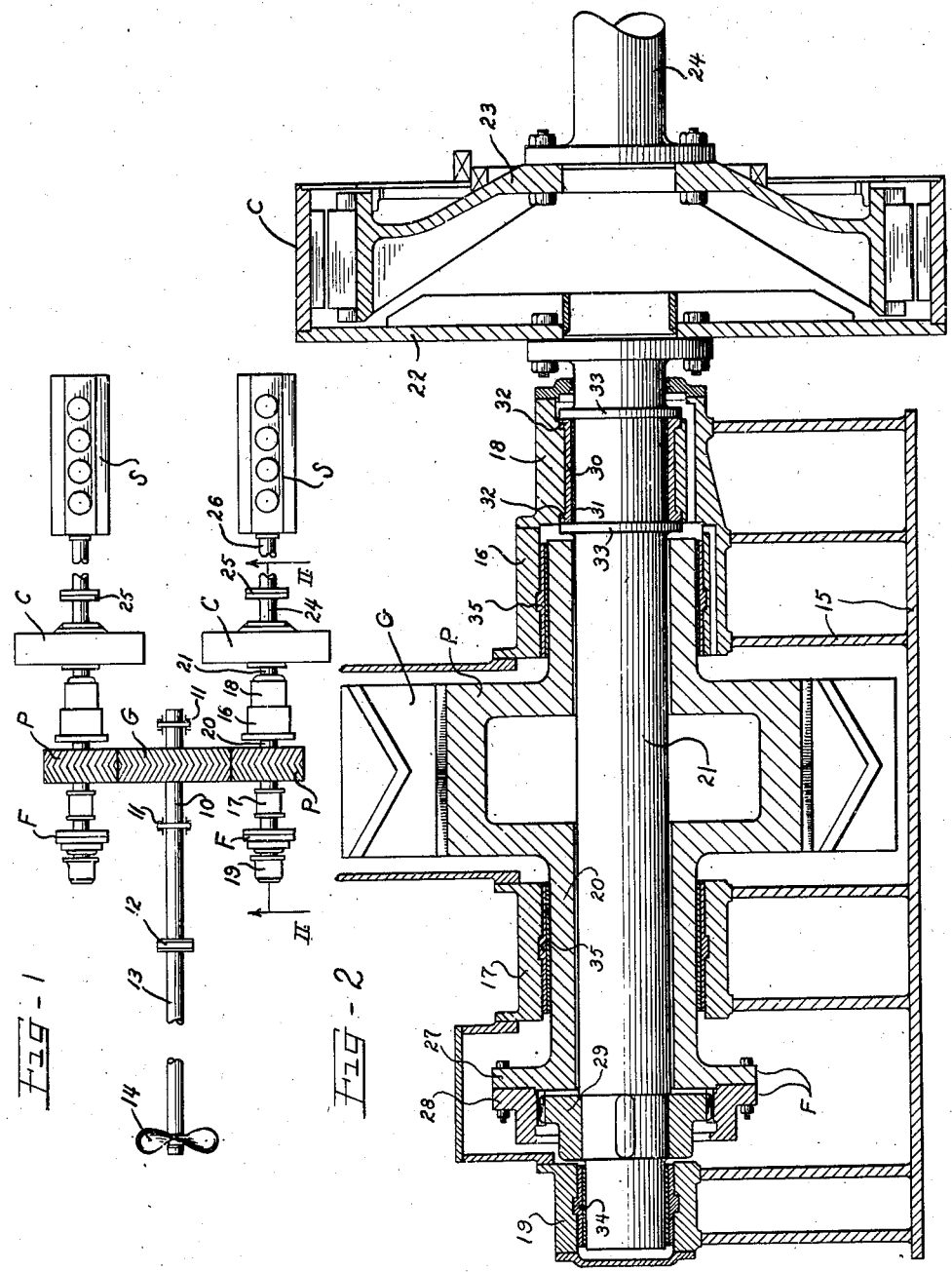
Inventor
AUSTIN KUHNS Patented Mar. 18, 1941

2,235,501

UNITED STATES PATENT OFFICE 2,235,501

SLIP COUPLING DRIVE ASSEMBLY

Austin Kuhns, Buffalo, N. Y., assignor to Farrel-Birmingham Company, Incorporated, Buffalo, N. Y., a corporation of Connecticut Application August 14, 1939, Serial No. 289,983

2 Claims. (Cl. 74—410)

This invention relates to drive assemblies, and particularly to drive assemblies in which a slip coupling of the electric or hydraulic type has the driven element supported on the end of a transmission shaft which has driving connection with a transmission pinion. For example, in ship propulsion, the driving gear for the propeller is meshed by driving pinions of driving assemblies in which the pinions are driven by the shafts which support the driven elements of the slip couplings whose driving elements are connected with driving sources, such as Diesel engines. For efficient operation in installations of this type, the bearing support and driving of the pinions must be such that correct gear-tooth alignment and mesh of the pinions with the driven gear will be maintained under all conditions of operation.

In a drive assembly where the coupling element is mounted on one end of a shaft and this shaft extends through the tubular shaft of the driving pinion, the heavy overhung coupling weight must be efficiently taken care of so that it will not interfere with the free movement of the driving pinion to maintain its proper toothed alignment and mesh with the driven gear. An important object of my invention is therefore to isolate and eliminate entirely the effect of the heavy overhung coupling weight on the support and arrangement of the driving pinion, and I preferably accomplish this by using separate bearings for the pinion shaft and the slip coupling shaft and the provision of a flexible coupling between the shafts so as to entirely free the driving pinion so that it may accurately and efficiently maintain its proper meshing condition with the driven gear under all conditions of operation.

My invention is incorporated in the structure disclosed on the drawing, in which drawing:

Figure 1 is a more or less diagrammatic plan view of a propulsion system to which my invention may be advantageously applied; and Figure 2 is an enlarged section on the plane II—II of Figure 1.

On Figure 1, I have shown a propulsion system in which my invention may be advantageously used. The system shown comprises a gear G mounted on the shaft 10 which is journaled in thrust bearings 11 and connected by a suitable coupling 12 with the propeller shaft 13 on which a propeller 14 may be mounted. At its opposite sides the gear is meshed by drive pinions P of the drive assemblies. The pinions are driven through slip coupling structures C by driving sources, such as Diesel engines.

Figure 2 shows the details of arrangement and operation of the drive assemblies. A strong, rigid supporting framework or foundation structure 15 provides for each assembly a pair of inner bearing structures 16 and 17 and outer bearing structures 18 and 19, the bearing structure 18 being adjacent to the inner bearing 16, and the bearing 19 being disposed a distance outwardly from the inner bearing 17. The inner bearings 16 and 17 journal a tubular shaft 20 for the pinion P, and the pinion, and shaft may be an integral structure.

Extending through the pinion shaft 20 and journaled in the outer bearings 18 and 19 is a coupling shaft 21 which, adjacent to the bearing 18, is secured to the external member 22 of a slip coupling which, as shown, may be of the electric type. The internal member 23 of the coupling is secured to the shaft 24, which shaft is connected by a coupling 25 with the shaft 26 of a source S (Figure 1).

At its outer end, the shaft 21 is in driving connection with the outer end of the pinion shaft through a flexible coupling F. As shown, this coupling may be of the dental type. The pinion shaft terminates in a flange 27 to which is secured an internal gear ring 28 which meshes with a gear 29 keyed to the shaft 21.

In the bearing 18, there is provided a bearing shell 30 for the shaft 21, and the shell preferably has a lining 31 of anti-friction material, such as babbitt. The shell has end flanges 32 engaging shoulders on the bearing so as to hold the shell against axial movement in the bearing, and the shaft has abutment collars 33 abutting the ends of the shell so that the bearing structure functions as a thrust bearing tending to hold the shaft 21 against axial displacement. The outer bearing 19 of the shaft is also provided with a babbitted bearing shell 34. The entire weight of the shaft 21 and the coupling element 22 carried thereby is borne by the bearings 18 and 19, there being ample clearance space between this shaft and the pinion shaft 20 so that the only connection between the shafts is through the flexible coupling F.

In the bearings 16 and 17, bearing shells 35 are provided, and there is sufficient clearance between the pinion and the ends of the bearings to permit axial shift of the pinion shaft in the bearings. Although the shaft 10 for the gear G is mounted in thrust bearings which tend to hold the shaft against axial displacement, there are abnormal conditions, such as when the propeller is suddenly reversed, when abnormal pressure may cause slight axial displacement of the gear shaft. However, with the pinion shafts free to shift axially, the pinions are enabled to follow any such axial movement of the gear shaft and gear so as to maintain proper meshing engagement.

In the flexible coupling connection F between the drive shaft 21 and the pinion shaft, there is sufficient clearance between the coupling elements to permit axial shift of the pinion shaft to follow any axial displacement of the driven gear, and the tooth arrangement of the flexible coupling is also such that any axial mis-alignment of the shaft 21 relative to the pinion shaft will not cause any strain on the pinion shaft. Any pressure caused by axial misalignment of the shaft 21, which might be occasioned by the overhung weight of the slip coupling during operation of the driving assembly, will be taken up and absorbed by the bearings 18 and 19 for the shaft 21 and will not be transmitted through the flexible coupling to the pinion shaft.

Thus, the effect of the heavy overhung slip coupling weight is isolated from the pinion structure, and the pinion structure may at all times freely and independently operate to insure correct tooth alignment and meshing with the driven gear under all conditions of operation. This is of particular advantage where the pinions and gears are of the helical or herring-bone type.

I have shown a practical and efficient embodiment of the features of my invention, but I do not desire to be limited to the exact construction and arrangement shown and described, as changes and modifications may be made without departing from the scope of the invention.

I claim as follows:

1. A transmission assembly comprising a gear to be driven and a supporting shaft therefor mounted in thrust bearings tending to prevent axial displacement of said shaft, a pinion meshing said gear, said pinion and gear being of the herring-bone type, a tubular supporting shaft for said pinion, plain bearings for said pinion shaft adjacent opposite sides of said pinion and providing sufficient clearance for axial movement of the shaft therein, a drive shaft extending through said pinion shaft but radially displaced therefrom, bearings for the ends of said drive shaft located outside of said pinion shaft bearings, a slip coupling having one of its elements adapted for connection with a driving source and its other element mounted on one end of said driving shaft to be supported solely by said shaft, a flexible coupling between the other end of said drive shaft and the adjacent end of said pinion shaft, means holding said drive shaft against axial movement in its bearings, said flexible coupling being arranged to transmit the rotary movement of said drive shaft to said pinion shaft and pinion without causing any strain on the pinion shaft during any misalignment of said drive shaft relative to said pinion shaft and to permit free axial shift of said pinion shaft for movement of the pinion to follow any axial displacement movement of said gear shaft and gear whereby proper meshing relation will be maintained at all times between the pinion and gear.

2. A driving assembly comprising a pinion of the helical tooth type for meshing with a gear to be driven, a tubular supporting shaft for said pinion, plain bearings for said pinion shaft adjacent opposite sides of said pinion and providing sufficient clearance for axial movement of the pinion shaft therein, a drive shaft extending through said pinion shaft, a slip coupling driving element secured to one end of said driving shaft, two bearings for said driving shaft located outside of said pinion shaft bearings for supporting the entire weight of said driving shaft entirely independently of said pinion shaft and its bearing, one of said driving shaft bearings being between said driving element and the corresponding bearing for said pinion shaft and close to said pinion shaft bearing and the other bearing for said drive shaft being separated by a short space from the other bearing for said pinion shaft, and a flexible coupling in said space connecting said shaft and arranged to transmit the rotation of said driving shaft to said pinion shaft without any strain on the pinion shaft during any axial misalignment of said drive shaft and arranged to permit the axial movement of said pinion shaft independently of said drive shaft to maintain said pinion in proper meshed connection with said gear at all times.

AUSTIN KUHNS.